United States Patent
Yamane

(10) Patent No.: US 11,054,625 B2
(45) Date of Patent: Jul. 6, 2021

(54) IMAGE ACQUISITION APPARATUS AND IMAGE ACQUISITION METHOD

(71) Applicant: TOSHIBA MEMORY CORPORATION, Tokyo (JP)

(72) Inventor: Takeshi Yamane, Tsukuba Ibaraki (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 119 days.

(21) Appl. No.: 16/567,252

(22) Filed: Sep. 11, 2019

(65) Prior Publication Data

US 2020/0285034 A1  Sep. 10, 2020

(30) Foreign Application Priority Data

Mar. 8, 2019  (JP) .............................. JP2019-043020

(51) Int. Cl.
| | |
|---|---|
| G02B 21/00 | (2006.01) |
| G02B 21/04 | (2006.01) |
| H04N 5/225 | (2006.01) |
| G01N 21/956 | (2006.01) |
| G02B 21/26 | (2006.01) |
| G01N 21/88 | (2006.01) |

(52) U.S. Cl.
CPC ....... *G02B 21/0072* (2013.01); *G01N 21/956* (2013.01); *G02B 21/04* (2013.01); *H04N 5/2256* (2013.01); *G01N 2021/8822* (2013.01); *G01N 2021/95676* (2013.01); *G02B 21/26* (2013.01)

(58) Field of Classification Search
CPC .... G02B 21/0072; G02B 21/04; G02B 21/26; H04N 5/2256; G01N 2021/8822; G01N 21/956; G01N 2021/95676
See application file for complete search history.

(56) References Cited

U.S. PATENT DOCUMENTS

| | | |
|---|---|---|
| 2003/0067598 A1 | 4/2003 | Tomie |
| 2011/0237087 A1 | 9/2011 | Yoshikawa |
| 2013/0017475 A1 | 1/2013 | Terasawa et al. |

FOREIGN PATENT DOCUMENTS

| | | |
|---|---|---|
| JP | H9-250966 A | 9/1997 |
| JP | 2001-66399 A | 3/2001 |

(Continued)

OTHER PUBLICATIONS

Toyoda et al., "At-Wavelength Extreme Unitraviolet Lithography Mask Observation Using a High-Magnification Objective with Three Multilayer Mirrors," Applied Physics Express, vol. 5, No. 11, pp. 112501-1-112501-3 (2012).

*Primary Examiner* — Hina F Ayub
*Assistant Examiner* — Amanda Merlino
(74) *Attorney, Agent, or Firm* — Finnegan, Henderson, Farabow, Garrett & Dunner, L.L.P.

(57) ABSTRACT

According to one embodiment, an image acquisition apparatus includes a light source, a stage on which an object to be observed is placed, a reflection mirror reflecting light from the light source and supplying reflected light to a surface of the object placed on the stage, an imaging optical system receiving an optical image from the surface of the object illuminated by the reflected light from the reflection mirror, and a detector detecting the optical image acquired by the imaging optical system. The reflection mirror includes a first portion reflecting light from the light source, and a second portion provided at a position opposite to the first portion with respect to a center of the reflection mirror and through which light from the surface of the object passes.

19 Claims, 4 Drawing Sheets

(56) References Cited

FOREIGN PATENT DOCUMENTS

| | | | |
|---|---|---|---|
| JP | 3728495 | B2 | 12/2005 |
| JP | 2011-203343 | A | 10/2011 |
| JP | 5758727 | B2 | 8/2015 |

IMAGE ACQUISITION APPARATUS AND IMAGE ACQUISITION METHOD

CROSS-REFERENCE TO RELATED APPLICATIONS

This application is based upon and claims the benefit of priority from Japanese Patent Application No. 2019-043020, filed Mar. 8, 2019, the entire contents of which are incorporated herein by reference.

FIELD

Embodiments described herein relate generally to an image acquisition apparatus and an image acquisition method.

BACKGROUND

Lithographic techniques with which extreme ultraviolet (EUV) light is used as exposure light have been proposed in response to the shrinking of semiconductor devices (semiconductor integrated circuit devices). According to EUV lithography, reflective masks are used as photomasks for exposure.

Inspections for the above masks are broadly classified into inspections in which a dark-field optical system is used and inspections in which a bright-field optical system is used.

DETAILED DESCRIPTION

In general, according to one embodiment, an image acquisition apparatus includes: a light source; a stage on which an object to be observed is placed; a reflection mirror which reflects light from the light source and which supplies reflected light to a surface of the object placed on the stage; an imaging optical system which receives an optical image from the surface of the object illuminated by the reflected light from the reflection mirror; and a detector which detects the optical image acquired by the imaging optical system. The reflection mirror includes a first portion which reflects light from the light source, and a second portion which is provided at a position opposite to the first portion with respect to a center of the reflection mirror and through which light from the surface of the object passes.

Embodiments will be described hereinafter with reference to the accompanying drawings.

Embodiment 1

Figure 1:
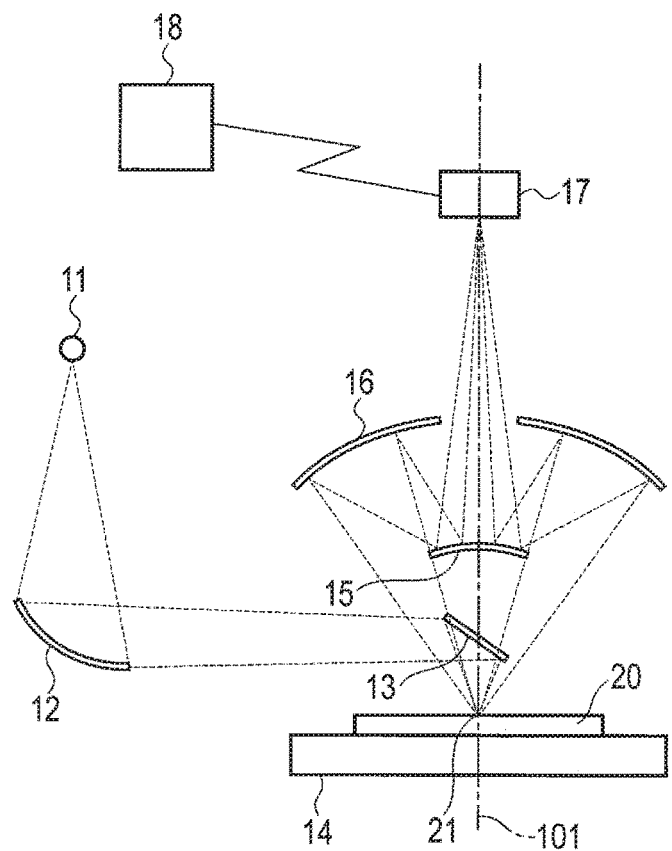
FIG. 1 is a diagram schematically showing the structure of an image acquisition apparatus according to a first embodiment.

FIG. 1 is a diagram schematically showing the structure of an image acquisition apparatus according to a first embodiment.

The image acquisition apparatus shown in FIG. 1 comprises a light source 11, an elliptical mirror 12, a reflection mirror (return mirror) 13, a stage 14, a convex mirror 15, a concave mirror 16, a detector (CCD detector) 17, and a personal computer 18.

In the image acquisition apparatus according to the present embodiment, an extreme ultraviolet (EUV) light source is used as the light source 11. In addition, a reflective photomask for EUV lithography is used as an object to be observed 20. The object to be observed (mask) 20 is placed on the stage 14, which is movable in a horizontal direction (X direction and Y direction).

Light (EUV light) from the light source 11 is reflected and focused by the elliptical mirror 12, and reaches the reflection mirror (return mirror) 13. The light from the light source 11 is reflected by the reflection mirror 13, and reflected light is supplied to the surface of the mask 20 placed on the stage 14. The direction of an optical axis 101 of the reflected light from the reflection mirror 13 corresponds (is identical) to the direction of a normal line of the surface of the mask 20 (Z direction: direction perpendicular to the X direction and the Y direction). Thus, the reflected light from the reflection mirror 13 is supplied to the surface of the mask 20 in a direction substantially perpendicular to the surface of the mask 20.

Figure 2:
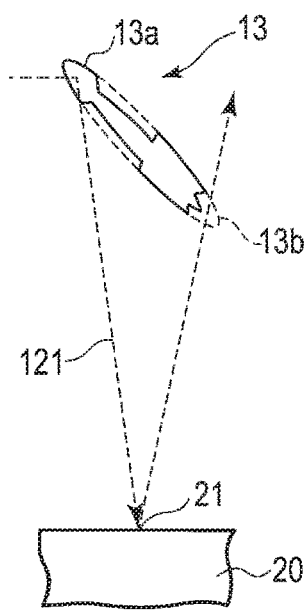
FIG. 2 is a sectional view schematically showing the structure of a reflection mirror of the image acquisition apparatus according to the first embodiment.
Figure 3:
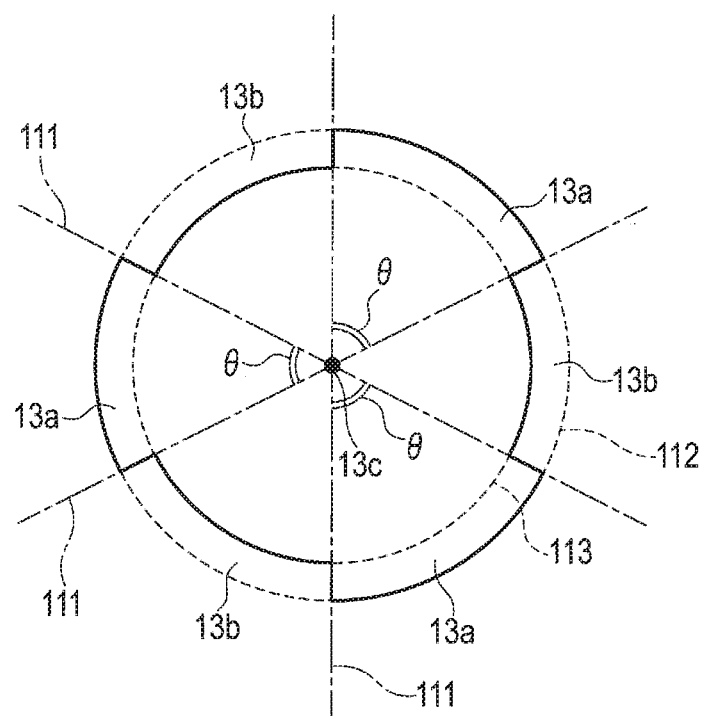
FIG. 3 is a plan view schematically showing the structure of the reflection mirror of the image acquisition apparatus according to the first embodiment.

FIG. 2 is a sectional view schematically showing the structure of the reflection mirror 13. FIG. 3 is a plan view schematically showing the structure of the reflection mirror 13.

The reflection mirror 13 comprises a first portion 13a which reflects light from the light source 11, and a second portion 13b which is provided at a position opposite to the first portion 13a with respect to a center 13c of the reflection mirror 13 and through which light from the surface of the object to be observed (mask 20) passes. More specifically, the first portion 13a and the second portion 13b are provided at positions where they are symmetrical with respect to the center 13c of the reflection mirror 13 from the perspective of an observation central point 21 represented by the intersection of the surface of the mask 20 and the optical axis 101.

In the present embodiment, the reflection mirror 13 comprises a plurality of first portions 13a and a plurality of second portions 13b. More specifically, the first portions 13a are projecting portions (wing portions) each having a projecting planar shape, and the second portions 13b are recessed portions each having a recessed planar shape. At a position opposite to each of the projecting portions 13a, a corresponding one of the recessed portions 13b is provided.

The basic planar shape of the reflection mirror 13 is circular from the perspective of the observation central point 21. Each of the projecting portions 13a corresponds to an area surrounded by straight lines 111 which divide the circular reflection mirror 13 into six parts, an outer circle line 112 of the reflection mirror 13, and an inner circle line 113 of the reflection mirror 13. The number of projecting portions 13a is an odd number, and the projecting portions 13a are provided at positions where they are rotationally symmetrical. In the present embodiment, the number of projecting portions 13a is three. Thus, an angle θ of each of the projecting portions 13a from the perspective of the center 13c of the reflection mirror 13 (angle defined by two straight lines connecting the center 13c and both edges of each of the projecting portions 13a of the reflection mirror 13, that is, an angle defined by the adjacent straight lines 111) is 60 degrees.

As described above, since the number of projecting portions 13a is an odd number, the recessed portions 13b can be provided at the positions opposite to the projecting portions 13a. Accordingly, as shown in FIG. 2, light 121 reflected by each of the projecting portions 13a passes through a corresponding one of the recessed portions 13b.

An imaging optical system which receives an optical image from the surface of the mask 20 illuminated by reflected light from the reflection mirror 13 is provided above the reflection mirror 13. That is, reflected light reflected by the surface of the mask 20 is incident on the imaging optical system. The reflected light from the surface of the mask 20 includes specular reflection light (regular reflection light) and diffuse reflection light (scatter reflection light). As the imaging optical system, a Schwarzschild optical system constituted of the convex mirror 15 and the concave mirror 16 is used. The outer peripheries of the convex mirror 15 and the concave mirror 16 constituting the imaging optical system are both circular from the perspective of the observation central point 21.

Figure 4:
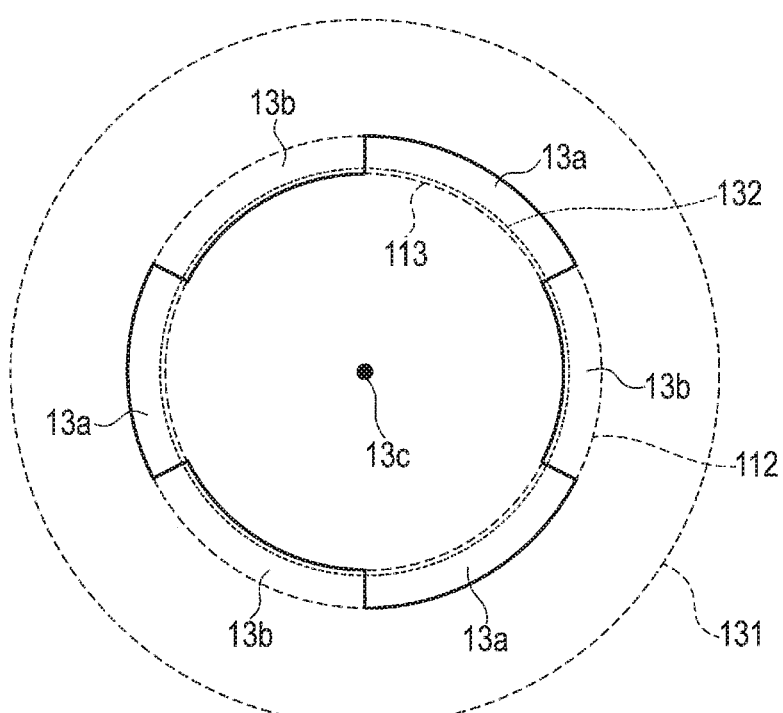
FIG. 4 is a diagram schematically showing the positional relationship between the reflection mirror and an imaging optical system in the image acquisition apparatus according to the first embodiment.

FIG. 4 is a central projection view schematically showing the positional relationship between the reflection mirror 13 and the imaging optical system (the convex mirror 15 and the concave mirror 16) from the perspective of the observation central point 21.

From the perspective of the observation central point 21, the outer periphery of the imaging optical system is located outside the outer periphery of the reflection mirror 13. More specifically, light reaching an outer circle line 131 of the concave mirror 16 constituting the imaging optical system passes through an area outside the outer circle line 112 of the reflection mirror 13. The distance between the outer circle line 131 of the concave mirror 16 and the outer circle line 112 of the reflection mirror 13 (from the perspective of the observation central point 21) is sufficiently large. An optical path of light which reaches an outer circle line 132 of the convex mirror 15 from the direction of the mask 20 overlaps an optical path of light which reaches the inner circle line 113 of the reflection mirror 13, or passes through a position slightly outside the inner circle line 113 of the reflection mirror 13. In addition, the outer circle line 112 of the reflection mirror 13 is located outside the outer circle line 132 of the convex mirror 15 from the perspective of the observation central point 21.

Moreover, from the perspective of the observation central point 21, the center of the reflection mirror 13 and the center of the imaging optical system (Schwarzschild optical system) are identical. More specifically, the central point of the outer circle line 112 of the reflection mirror 13, the central point of the inner circle line 113 of the reflection mirror 13, the central point of the outer circle line 132 of the convex mirror 15, and the central point of the outer circle line 131 of the concave mirror 16 are identical from the perspective of the observation central point 21. In addition, the optical axis of light supplied to the mask 20 (reflected light from the reflection mirror 13) and the optical axis of light reflected by the mask 20 passes through the above central points.

Part of reflected light (specular reflection light and diffuse reflection light) from the surface of the mask 20 is blocked by the reflection mirror 13 and the convex mirror 15. That is, the reflection mirror 13 and the convex mirror 15 function as blocking portions of the reflected light from the surface of the mask 20. Light not blocked by the reflection mirror 13 and the convex mirror 15 of the reflected light from the surface of the mask 20 is collected on the concave mirror 16. Thus, light passing through areas corresponding to the recessed portions 13b of the reflection mirror 13, as well as light passing through an area sandwiched between the outer circle line 112 of the reflection mirror 13 and the outer circle line 131 of the concave mirror 16, of the reflected light from the surface of the mask 20 is also incident on the concave mirror 16.

Light reflected by the concave mirror 16 is incident on the convex mirror 15, and reflected light from the convex mirror 15 is incident on the detector (CCD detector) 17. That is, an optical image acquired by the imaging optical system (the convex mirror 15 and the concave mirror 16) is detected by the detector 17. A detection signal from the detector 17 is captured by the personal computer 18, and in the personal computer 18, the detection signal is analyzed.

For example, in the personal computer 18, an optical image of the mask 20 acquired by the above-described method is compared with an ideal image (reference image) acquired from design data of the mask 20, and it is determined that a point differing between the images is a defective point. Moreover, if the mask 20 includes identical mask patterns, it is also possible to compare an optical image of a mask pattern acquired by the above-described method with an optical image of another mask pattern acquired by the above-described method, and determine that a point differing between the images is a defective point.

As described above, in the image acquisition apparatus of the present embodiment, the reflection mirror 13 comprises the projecting portions (first portions) 13a which reflect light from the light source 11, and the recessed portions (second portions) 13b which are provided at the positions opposite to the projecting portions (first portions) 13a with respect to the center of the reflection mirror 13 and through which light from the surface of the mask (object to be observed) 20 passes. Thus, light reflected by the projecting portions 13a of the reflection mirror 13 is supplied to the surface of the mask 20, and reflected light from the surface of the mask 20 can reach the concave mirror 16 of the imaging optical system via the recessed portions 13b of the reflection mirror 13. Accordingly, even if illuminating light is not radiated to the mask 20 in an oblique direction with respect to the normal line of the mask 20, an appropriate bright-field image can be acquired. That is, a bright-field image having resolution (detection sensitivity) independent of directions can be acquired, and a distortion of an image in a defocused state can be suppressed. Thus, according to the present embodiment, a highly accurate optical image can be effectively acquired.

In addition, in the image acquisition apparatus of the present embodiment, the outer periphery of the imaging optical system (the convex mirror 15 and the concave mirror 16) is located outside the outer periphery of the reflection mirror 13 from the perspective of the observation central point 21. Thus, light passing an area outside the reflection mirror 13 of reflected light from the surface of the mask 20 can be effectively acquired by the imaging optical system.

Moreover, in the image acquisition apparatus of the present embodiment, the direction of the optical axis of reflected light from the reflection mirror 13 is identical to the direction of the normal line of the surface of the mask (object to be observed) 20, and from the perspective of the observation central point 21, the center of the reflection mirror 13 and the center of the imaging optical system are identical. Thus, the optical axis of light supplied to the mask 20, the optical axis of light reflected by the mask 20, and the central axis of the imaging optical system can be made identical, and a bright-field image having resolution (detection sensitivity) independent of directions can be more effectively acquired.

Figure 5:
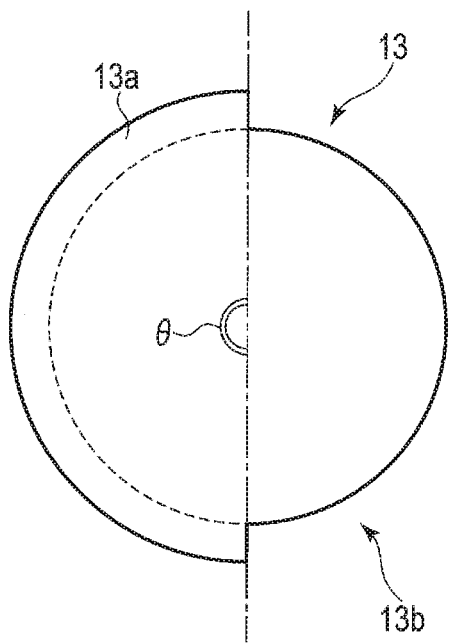
FIG. 5 is a plan view schematically showing the structure of a first modified example of the reflection mirror in the image acquisition apparatus according to the first embodiment.

FIG. 5 is a central projection view from the perspective of the observation central point 21, schematically showing the structure of a first modified example of the reflection mirror 13 in the image acquisition apparatus according to the present embodiment. In the above-described embodiment, the reflection mirror 13 is provided with the projecting portions 13a and the recessed portions 13b. In contrast, in the present modified example, the reflection mirror 13 is provided with one projecting portion 13a and one recessed portion 13b. Also in this structure, the same advantages as those of the above-described embodiment can be obtained as long as the recessed portion 13b is provided at a position opposite to the projecting portion 13a.

Figure 6:
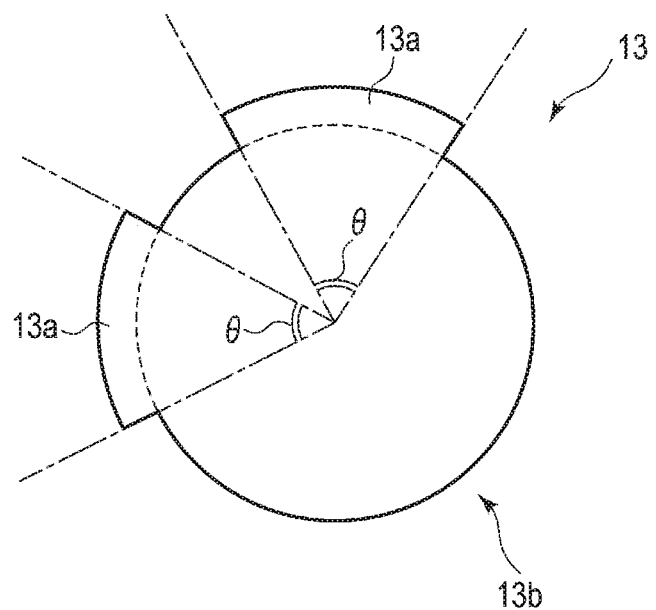
FIG. 6 is a plan view schematically showing the structure of a second modified example of the reflection mirror in the image acquisition apparatus according to the first embodiment.

FIG. 6 is a central projection view from the perspective of the observation central point 21, schematically showing the structure of a second modified example of the reflection mirror 13 in the image acquisition apparatus according to the present embodiment. In the above-described embodiment, the reflection mirror 13 is provided with an odd number of projecting portions 13a. In contrast, in the present modified example, the reflection mirror 13 is provided with an even number of projecting portions 13a. Also in this structure, the same advantages as those of the above-described embodiment can be obtained as long as the recessed portion 13b is provided at a position opposite to the projecting portions 13a.

In the above-described embodiment (including the first modified example and the second modified example), the sum of the angle(s) θ of the projecting portion(s) 13a from the perspective of the center 13c of the reflection mirror 13 is, preferably, 90 degrees or more, and more preferably, approximately 180 degrees.

Embodiment 2

A second embodiment will be described next. Since the basic matters are the same as those of the first embodiment, description of the matters described in the first embodiment will be omitted.

The present embodiment further comprises a blocking-member attaching structure to which a blocking member is capable of being attached, in addition to the structures of the first embodiment. The blocking member blocks light supplied from a light source 11 to a mask (object to be observed) 20 placed on a stage 14 via a projecting portion (first portion) 13a of a reflection mirror 13. More specifically, a blocking-member attaching structure for enabling a blocking member to be placed at a position on the light source 11 side with respect to the reflection mirror 13 or a conjugate position is provided.

Figure 7:
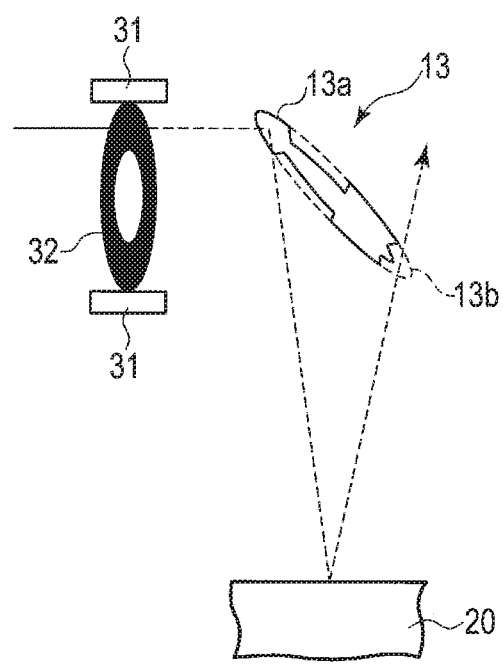
FIG. 7 is a diagram schematically showing part of the structure of an image acquisition apparatus according to a second embodiment.

FIG. 7 is a diagram schematically showing part of the structure of an image acquisition apparatus according to the second embodiment. The basic structure of the entire image acquisition apparatus is the same as that of the first embodiment.

In the example of FIG. 7, a blocking-member attaching structure 31 is provided at a position on the light source 11 side with respect to the reflection mirror 13, so that an aperture portion can be attached to the blocking-member attaching structure 31 as a blocking member 32. The blocking member 32 comprises a shade portion having a ring form, and a pervious portion inside the shade portion. By attaching the blocking member 32 to the blocking-member attaching structure 31, illuminating light reaching the projecting portion (first portion) 13a of the reflection mirror 13 is blocked by the shade portion of the blocking member 32. Illuminating light passing through the pervious portion of the blocking member 32 reaches the reflection mirror 13, is reflected by the reflection mirror 13 and supplied to the mask (object to be observed) 20. Thus, when the blocking member 32 is attached to the blocking-member attaching structure 31, a dark-field image can be acquired.

In this manner, in the present embodiment, when the blocking member 32 is not attached to the blocking-member attaching structure 31, a bright-field image can be acquired according to the principle described in the first embodiment, and when the blocking member 32 is attached to the blocking-member attaching structure 31, a dark-field image can be acquired. Accordingly, a bright-field image and a dark-field image can easily be acquired with the one image acquisition apparatus. Furthermore, the type of defect of the mask 20 also can be determined on the basis of a difference between the bright-field image and the dark-field image.

Embodiment 3

A third embodiment will be described next. Since the basic matters are the same as those of the first embodiment, description of the matters described in the first embodiment will be omitted.

Figure 8:
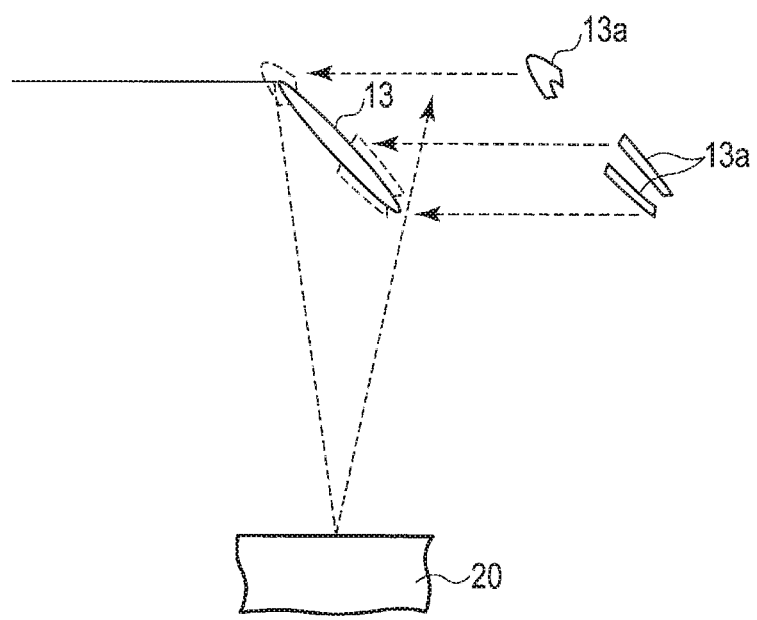
FIG. 8 is a diagram schematically showing part of the structure of an image acquisition apparatus according to a third embodiment.

FIG. 8 is a diagram schematically showing part of the structure of an image acquisition apparatus according to the third embodiment. The basic structure of the entire image acquisition apparatus is the same as that of the first embodiment.

As shown in FIG. 8, in the present embodiment, projecting portions (first portions) 13a of a reflection mirror 13 are detachable. A dark-field image can be acquired by detaching the projecting portions 13a from a main body of the reflection mirror 13.

In this manner, in the present embodiment, when the projecting portions 13a are attached to the main body the reflection mirror 13, a bright-field image can be acquired according to the principle described in the first embodiment, and when the projecting portions 13a are detached from the main body of the reflection mirror 13, a dark-field image can be acquired. Accordingly, a bright-field image and a dark-field image can easily be acquired with the one image acquisition apparatus. Furthermore, the type of defect of the mask 20 also can be determined on the basis of a difference between the bright-field image and the dark-field image.

Furthermore, in the above-described first, second and third embodiments, the Schwarzschild optical system is used as the imaging optical system. The imaging optical system may be any imaging optical system which collects light reflected by the mask 20 and which has the functions described in the above-described embodiments.

In addition, while a mask for EUV exposure is used as the mask 20 serving as an object to be observed in the above-described first, second and third embodiments, other masks for exposure also may be used. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image acquisition apparatus comprising:
a light source;
a stage on which an object to be observed is placed;
a reflection mirror which reflects light from the light source and which supplies reflected light to a surface of the object placed on the stage;
an imaging optical system which receives an optical image from the surface of the object illuminated by the reflected light from the reflection mirror; and
a detector which detects the optical image acquired by the imaging optical system,
wherein the reflection mirror includes a first portion which reflects light from the light source, and a second portion which is provided at a position opposite to the first portion with respect to a center of the reflection mirror and through which light from the surface of the object passes.

2. The apparatus of claim 1, wherein an outer periphery of the imaging optical system is located outside an outer periphery of the reflection mirror from a perspective of an observation central point defined by an intersection of the surface of the object placed on the stage and an optical axis of the reflected light from the reflection mirror.

3. The apparatus of claim 1, wherein a direction of an optical axis of the reflected light from the reflection mirror corresponds to a direction of a normal line of the surface of the object.

4. The apparatus of claim 1, wherein a center of the reflection mirror and a center of the imaging optical system are identical from a perspective of an observation central point defined by an intersection of the surface of the object placed on the stage and an optical axis of the reflected light from the reflection mirror.

5. The apparatus of claim 1, wherein the imaging optical system is a Schwarzschild optical system.

6. The apparatus of claim 1, wherein the first portion of the reflection mirror includes a projecting portion, and
the second portion of the reflection mirror includes a recessed portion.

7. The apparatus of claim 1, wherein the reflection mirror includes a plurality of first portions including a plurality of projecting portions,
the number of the projecting portions is an odd number, and
the projecting portions are provided at positions which are rotationally symmetrical.

8. The apparatus of claim 1, wherein a basic planar shape of the reflection mirror is circular from a perspective of an observation central point defined by an intersection of the surface of the object placed on the stage and an optical axis of the reflected light from the reflection mirror.

9. The apparatus of claim 1, wherein an outer periphery of the imaging optical system is circular from a perspective of an observation central point defined by an intersection of the surface of the object placed on the stage and an optical axis of the reflected light from the reflection mirror.

10. The apparatus of claim 1, further comprising a blocking-member attaching structure to which a blocking member is capable of being attached, the blocking member blocking light supplied from the light source to the object placed on the stage via the first portion of the reflection mirror.

11. The apparatus of claim 1, wherein the first portion of the reflection mirror is detachable.

12. The apparatus of claim 1, wherein the object is a reflective photomask.

13. An image acquisition method comprising:
reflecting light from a light source by a reflection mirror to supply reflected light to a surface of an object to be observed placed on a stage;
receiving, by an imaging optical system, an optical image from the surface of the object illuminated by the reflected light from the reflection mirror; and
detecting, by a detector, the optical image acquired by the imaging optical system,
wherein the reflection mirror includes a first portion which reflects light from the light source, and a second portion which is provided at a position opposite to the first portion with respect to a center of the reflection mirror and through which light from the surface of the object passes.

14. The method of claim 13, wherein an outer periphery of the imaging optical system is located outside an outer periphery of the reflection mirror from a perspective of an observation central point defined by an intersection of the surface of the object placed on the stage and an optical axis of the reflected light from the reflection mirror.

15. The method of claim 13, wherein a direction of an optical axis of the reflected light from the reflection mirror corresponds to a direction of a normal line of the surface of the object.

16. The method of claim 13, wherein a center of the reflection mirror and a center of the imaging optical system are identical from a perspective of an observation central point defined by an intersection of the surface of the object placed on the stage and an optical axis of the reflected light from the reflection mirror.

17. The method of claim 13, wherein the imaging optical system is a Schwarzschild optical system.

18. The method of claim 13, wherein the first portion of the reflection mirror includes a projecting portion, and
the second portion of the reflection mirror includes a recessed portion.

19. The method of claim 13, wherein the reflection mirror includes a plurality of first portions including a plurality of projecting portions,
the number of the projecting portions is an odd number, and
the projecting portions are provided at positions which are rotationally symmetrical.

* * * * *